United States Patent [19]

Classen

[11] Patent Number: 4,819,734

[45] Date of Patent: Apr. 11, 1989

[54] LAWN AERATOR WITH ROCKER ARM TINE SYNCHRONIZING MEANS

[76] Inventor: Alvin T. Classen, P.O. Box 172, Norfolk, Nebr. 68701

[21] Appl. No.: 168,196

[22] Filed: Mar. 15, 1988

[51] Int. Cl.⁴ ............................................. A01B 45/02
[52] U.S. Cl. ......................................... 172/22; 172/84
[58] Field of Search ...................... 172/21, 22, 42, 43, 172/95, 82, 84, 88, 93, 100, 101, 97, 99; 111/7, 89

[56] References Cited

U.S. PATENT DOCUMENTS

| | | | |
|---|---|---|---|
| 1,081,686 | 12/1913 | McGough | 172/84 |
| 2,223,559 | 12/1940 | Fleming | 172/84 X |
| 2,638,831 | 5/1953 | Ferguson | 172/22 |
| 2,800,066 | 7/1957 | Cohrs | 172/22 |
| 3,429,378 | 2/1969 | Mascaro | 172/22 |
| 4,602,687 | 7/1986 | Hansen | 172/22 |
| 4,606,412 | 8/1986 | Classen | 172/22 |
| 4,658,909 | 4/1987 | McDermott | 172/22 |

FOREIGN PATENT DOCUMENTS 8949 of 1905 United Kingdom ................. 172/21

*Primary Examiner*—Richard J. Johnson
*Attorney, Agent, or Firm*—Sughrue, Mion, Zinn, Macpeak & Seas

[57] ABSTRACT

Rocker arms are mounted for pivoting at their centers about a vertical axis on a chassis with the pivot axis in line with a longitudinal slot through which a crank arm projects. The upper end of the crank arm is pivoted to a crank which upon rotation reciprocates the crank shaft vertically. One or more tines project downwardly from the bottom of the crank arm below the longitudinal slot in the chassis through which the lower end of the crank arm projects and within which the crank arm is permitted to oscillate fore and aft during movement of the aerating machine over the turf. A pair of connecting rods are pivotably mounted at one end to vertical studs fixedly mounted to the rocker arm to opposite sides of the vertical pivot axis of the rocker arm on the chassis. The opposite ends of the pair of connecting rods are pivotably coupled to laterally adjacent crank arms and the connecting rods are of equal length to cause the crank arms to oscillate 180° out of phase within the guide slots through which the crank arms pass during alternate projection of the tines of respective crank arms into the turf and retraction therefrom.

7 Claims, 3 Drawing Sheets

LAWN AERATOR WITH ROCKER ARM TINE SYNCHRONIZING MEANS

FIELD OF THE INVENTION

This invention relates to machines for perforating turf, removing plugs and insuring admittance of air, light and water to the roots thereof, and more particularly, to a rocker arm mechanism for positive control of insured opposite oscillation of adjacent cranks arms bearing respective tines for perforating the turf.

BACKGROUND OF THE INVENTION

The applicant has developed a series of lightweight, compact self-propelled lawn aeration machines characterized by upper and lower wheel sets rotatably mounted in journals fixed to a machine frame riser, and to opposite sides thereof for rotation of the dual wheels for the upper sets and dual wheels for the lower sets about a horizontal axis. The wheels are linked by jack shafts for synchronized rotation, with a given upper and lower wheel of each wheel set being linked by a jack shaft for synchronized rotation or by a chain coupled to the wheels, which wheels take the form of sprocket wheels, and wherein the upper wheel of each wheel set pivotably mounts one end of a crank arm, while the other end of the crank arm reciprocates through a bushing rotatably mounted on the lower wheel of the wheel set. Further, in each case, whether the wheel sets are coupled by a jack shaft or a crank arm, the lower, terminal end of the respective jack shaft or crank arm fixedly mounts an in-line tine functioning to penetrate the turf. The tines are hollow and the tine penetration results in the creation of a cylindrical plug of turf and earth, which plug is retracted from the ground during retraction of the tine, thus producing small diameter, relatively short depth air holes within the turf.

Further, applicant's machines are exemplified by provision of means at respective wheels for pivotably coupling the jack shaft or crank arm to the upper and lower wheels at circumferentially offset positions with respect to coaxial wheels adjacent thereto for the adjacent tines and/or at selective radially different positions with respect to the axis of rotation of the wheels to vary the forward travel speed of the machine or to vary the timing in terms of penetration and retraction of the tines borne by the machine. As may be appreciated, it is the penetration and subsequent retraction of the machine that causes the machine to self-drive, that is to move itself forwardly over the surface of the turf while penetrating the turf, and in most machines, carving out a small diameter cylindrical plug which is removed during retraction of the tine. The machines developed by the applicant are exemplified by U.S. Pat. Nos. 4,606,411; 4,606,412; and 4,662,456. In the machines as exemplified by these three patents, the lower wheels of each of the wheel sets may function as high speed flywheels to provide more than adequate force for penetrating the hollow tines into the turf and retraction therefrom in time sequence, even when the turf is relatively dry and hard. Further, in U.S. Pat. No. 4,606,412, the upper wheel of each wheel set determines the depth of penetration of the tine borne by a crank arm emanating from the upper wheel, while the radial position of a bushing on the lower wheel of each wheel set determines the extent of travel of the machine over the turf as a result of tine penetration and removal.

While the self-propelled lawn aeration machines of my prior patents are highly effective, are light weight and may operate at relatively high speed, and while they function adequately to self-drive the machine across the surface of the turf by tine penetration and removal, they are somewhat complicated by the necessity of employing upper and lower wheels forming a series of wheel sets, with the wheels mounted for rotation about their axes on the frame supporting the tine driving mechanism. The machines as set forth in the patents cited above are in turn an improvement over an art which is developed over the years and which art is exemplified by a large number of patents cited in column 1 of my '456 Patent. Reference may be had thereto for a further understanding and appreciation of the type of mechanism to which the present invention constitutes a further improvement.

In somewhat more recent years, a turf aerating machine has been developed in which a generally vertically reciprocating crank arm is rotatably supported at its upper end to a crankshaft, and is guided near its lower end by a horizontal plate with a longitudinal horizontal elongated slot for laterally guiding the lower end of the crank arm, such that a tine, fixed to the lower end of the crank arm, penetrates the turf during rotation of the crank arm. This causes the machine to be self-driven forwardly during that rotation, and during which the tine sidewardly penetrates the earth and is retracted therefrom. Such machine is exemplified by U.S. Pat. No. 4,658,909. In U.S. Pat. No. 4,658,909, a flat horizontal plate underlying the crankshaft is slotted fore and aft at laterally spaced positions, through which slots project the crank arms bearing the fixedly mounted tines, such that the crank arms are guided by the slots during rotation of the crankshaft and during projection of the tines into the turf and retraction therefrom effecting self-drive of the machine. A tension coil spring fixed at one end to the frame and its opposite end to a crank arm bearing the tine, causes each crank arm to be biased towards the forward end of the slot when the tine is engaged in the ground due to the forward motion of the aerator over the turf. When the tine is retracted from the ground by the crankshaft, the crank arm is returned to the forward end of the slot by the coil spring as a result of the stored energy due to expansion of the spring. While tending to return the tine arms to a forwardmost position prior to tine repenetration into the turf, such action is too slow for high speed operation of the machine, the biasing force may vary from spring to spring, and the springs are subject to breakage. Additionally, the springs are too slow in reacting, thus incapable of repositioning the tine arm at high cyclic speeds to which the more recent lawn aerating machines are subjected.

It is therefore a primary object of this invention to provide an improved lawn aeration machine which utilizes a single series of axially aligned light weight metal discs fixedly mounted to a common shaft segments and commonly driven, which employ tine arms pivotably mounted to the wheel at circumferentially offset position, where the tine arms are guided by projecting through slots formed by a chassis member above the projecting lower end of the tine arms, to which the tines are fixedly mounted, in which the fore and aft oscillation of the tine arm is positively controlled and synchronized, which eliminates the needs for return springs, which is devoid of any hydraulics, which eliminates the possibility of oil damage to the turf, in which the tines work in a straight up and down reciprocation to eliminate turf sidewall compaction and which permits easier maintenance of the machine.

DESCRIPTION OF THE PREFERRED EMBODIMENT

Figure 1:
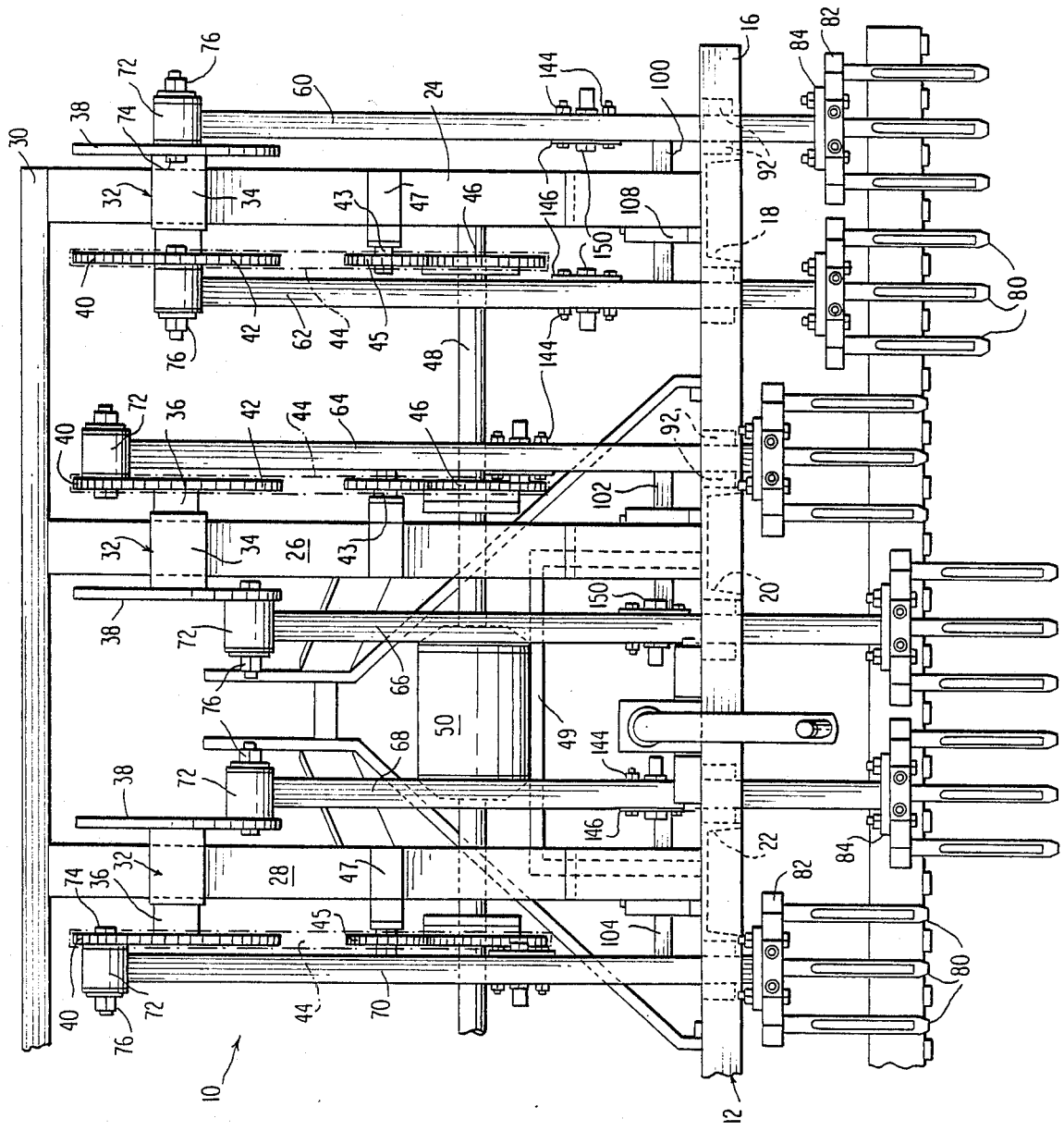
FIG. 1 is a front elevational view of the tine mounting, driving and control system of a portion of a self-propelled lawn aeration machine forming a preferred embodiment of the present invention.

Referring to the Figures, the lawn aeration machine, indicated generally at 10, comprises a wheeled frame or chassis, indicated generally at 12, supporting the principal components of the machine. The chassis may be in many respects similar to that of that of U.S. Pat. No. 4,662,456, referred to previously. Frame 12 comprises a horizontal, transversely extending front bar 14 complimenting a parallel horizontal rear bar 16. Bars 14 and 16 may be of tubular steel of solid steel being hollow and square in cross section. Integrally welded at opposite ends and joining the front bar 14 to the rear bar 16 are several, laterally spaced longitudinally extending, horizontal angle bars 18, 20, 22, etc. defining an open rectangular framework suitable for mounting the various operative components of the machine. A number of vertical risers 24, 26, 28, etc. are welded at their lower ends to the frame members 18, 20, 22, respectively, and which may be joined at their upper ends by transverse cross bars 30. Brackets 32 welded to the sides of the risers 24, 26, 28 rotatably mount by way of bearings 34, rotatable crankshafts 36 which rotate about a horizontal axis. Fixedly mounted to each crankshaft 36, at one end, is a thin disc or light weight wheel 38 of similar diameter, for rotation about a common axis and being suitably driven by toothed, drive sprocket wheels 40 fixed to the opposite end of crankshafts 36, to the opposite side of each riser, 24, 26, 28, etc. Shafts 36 and wheels 38, 40 define cranks to which crank arms are rotatably mounted. In the illustrated embodiment, crankshafts 36 are of segment form so that at each riser location, each bracket 32 supports a short sectional crankshaft 36. Wheels 38 are driven wheels while the others 40, are drive wheels. The drive wheels 40 having teeth 42 about their periphery, are engaged by chains 44. The chains 44, in turn, are also leaved about drive sprocket wheels 46 which are all mounted for rotation about a common drive shaft 48, driven by an appropriate power source. Idler shafts 43 support idler wheels 45 via brackets 47. The power source may be a drive unit 50 as shown mounted by a support 49, appropriately driven by a tractor, or an electric motor or an internal combustion engine. The paired wheels 38, 40 mounted to opposite sides of each riser 24, 26, 28, etc. are each provided with four holes 52, spaced circumferentially at 90°, radially outwardly of the axis of the sectional drive shaft 36. As such, individual crank arms such as crank arms 60, 62, 64, 66, 68, 70, each having a hollow cylindrical bushing 72 fixedly welded to the upper end thereof with the bushing axis perpendicular to the axis of the crank arm, are mounted for rotation about the bushing axis by bolts 74 passing through holes 52, within the wheels 38, 40, sequentially at circumferentially offset positions and bearing nuts 76. The crank arms 60, 62, etc. project vertically downwardly, absent tine penetration at their lower ends into the underlying turf T. In the illustrated embodiment, for each tine arm, three tines 80 project downwardly from a tine mounting block 82, which block, in turn, is bolt mounted via a collar 84 to its crank arm. Collars 84 are fixedly mounted to the lower end of the respective crank arms 60, 62, 64, 66, 68, 70, 72. During machine movement forwardly, penetration of the tines 80 into the Turf T occurs and continued rotation of the upper ends of the crank arms occurs about the axis of rotation of wheels 38, 40 and shaft segments 36. The crank arms must oscillate about the axis of rotation created by the bushings 72. A sleeve bearing 78 of a low coefficient of friction material is preferably concentrically mounted within bushing 72 about the shank of bolt 74. Fore and aft movement is permitted by guide assemblies, FIG. 5, indicated generally at 90 which consist of a pair of rectangular plastic strips or bars 92 formed of DELRIN (or other low coefficient of friction material such as TEFLON) with transverse holes 94 drilled therethrough receiving bolts 96 which function to support rollers 98 between the bars 92 for rotation about the axis of bolts 96. The bolts also function to bolt the guide assemblies 90 to respective sides of the angle bars 18, 20, 22, etc. Thus, for the six crank arms 60, 62, 64, 66, 68 and 70, there are six guide assemblies forming slots 97 which extend horizontally and which are sized so as to slidably receive the crank arms 60, 62, etc. for oscillation longitudinally over the major length of the slots 97.

As described so far, the components of the machine have some general similarity to the content of U.S. Pat. No. 4,658,909 issued Apr. 21, 1987 to Brian P. McDermott et al. However, in the present invention, the crank arms 60, 62, 64, 66, 68, 70 are not permitted to freely oscillate whether self-driven by penetration and removal of the tines 80 from turf T during "walking" of the machine across the turf or otherwise, nor are the crank arms 60, 62, 64, 66, 68, 70 permitted to rotate back to a front position proximate to front bar 14 under the bias of a tension spring or the like, as in U.S. Pat. No. 4,658,909.

Figure 5:
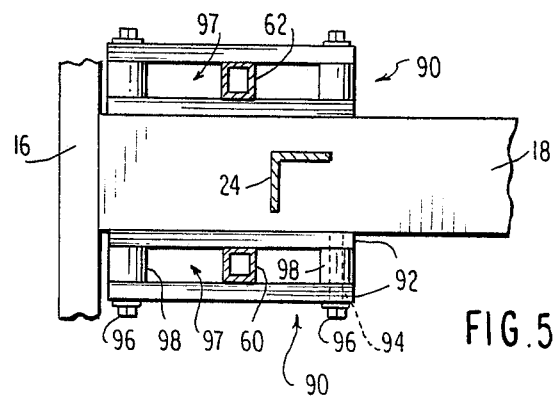
FIG. 5 is a horizontal sectional view of the portion of the machine shown in FIG. 2 taken about line V—V illustrating paired guide assemblies to opposite sides of the chassis member.
Figure 3:
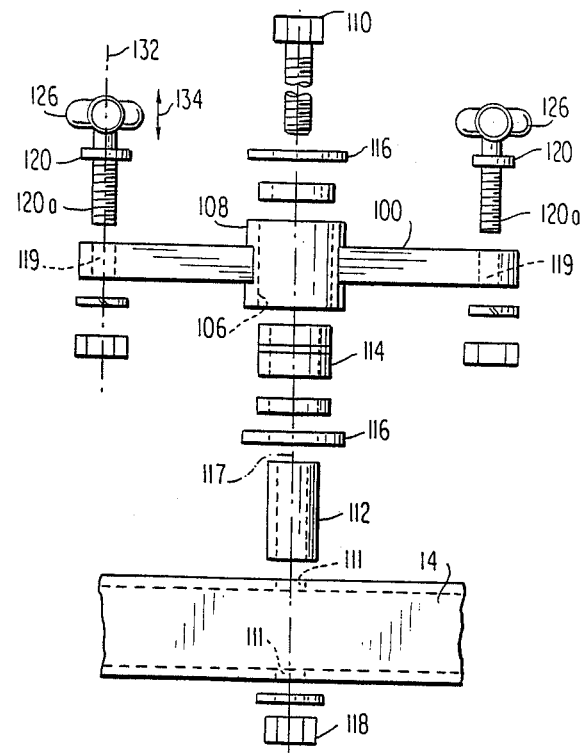
FIG. 3 is an exploded view of a rocker arm assembly for the machine of FIGS. 1 and 2.
Figure 4:
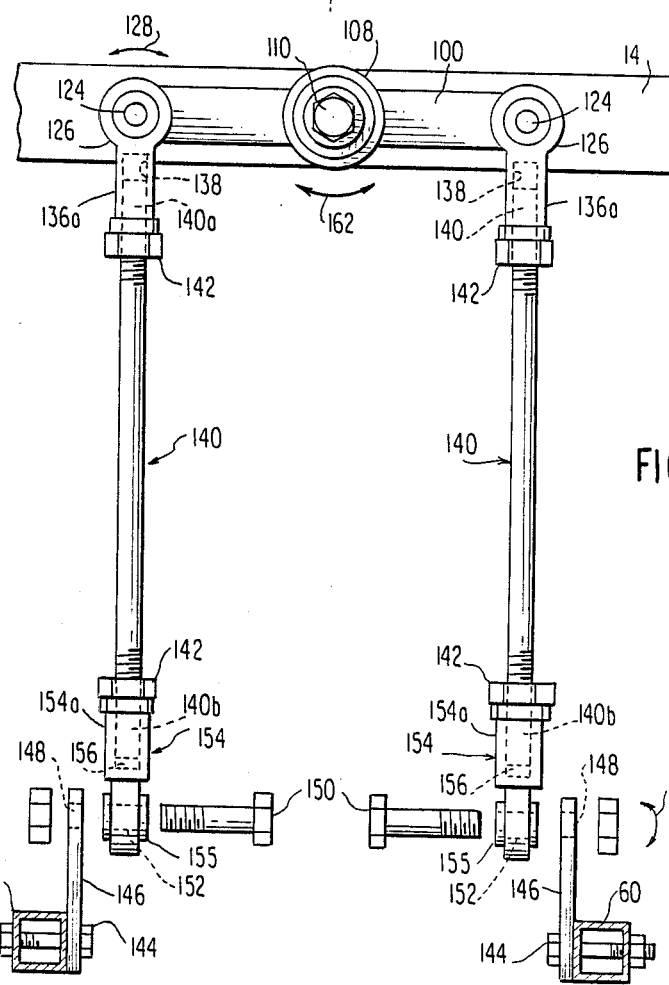
FIG. 4 is a partial exploded, top plan view of the rocker arm assembly of FIG. 3 with the pair of connecting rods mounted thereto.

In contrast, applicant's machine employs multiple rocker arm assemblies 99, FIGS. 4 and 5, each including a rocker arm 100, 102, 104, etc. for every two crank arms 60, 62, etc. The rocker arms 100, 102, 104, etc. are rectangular metal bars of parallelepiped form of relatively short length, having holes 106 drilled through the center of the same. Preferably, a bushing 108 is welded to the bar at hole 106 and extends vertically at right angles to the longitudinal axis of the rocker arm. Bolts 110 pass through holes 111 with front bar 14 at equidistant positions aligned with respective angle bars 18, 20, 22, etc. The bolts 110 project through a steel sleeve 112 surrounded by steel cylindrical bearings 114 having an outer diameter sized to the inner diameter 106 of rocker arm bushing 108, and positioned therein. Nylon thrust washers 116 are mounted on bolt 110 to opposite sides thereof, and a nut 118 threaded to the end of the bolt shank locks the plastic cylindrical bearing 114 in place. As such, each crank arm is rotatably mounted for oscillation about the vertical axis of a bolt 110.

Adjacent the outboard ends of each of the rocker arms 100, 102, 104, etc., at equal distance from the axis of rotation as defined by the axis 117 of bolt 110, are found stud mounting holes 119, receiving vertically upright studs 120 which terminate in a spherical, radially enlarged portion or heads 124 at one end and in threaded shank portions 120a at the opposite end. The studs 120 are fixed to the ends of the rocker arms 100, 102, 104, etc. by nuts threaded to shanks 120a. Physically mounted to the spherical, radially enlarged portions 124 of studs 120 are socket members 126a of rod end bearings 126 which socket members encircle heads 124. The socket members 126 about spherical portions 124 of the studs permit rotation about the vertical axis 132 of studs 122 as per arrow 128, and also limited angular shifting about the horizontal axis as per double headed arrow 134. The rod end bearings 126 each include a short length radial arm 136a having a tapped axial hole 138 which receives a threaded end 140a of a connecting rod indicated generally at 140 whose opposite end 140b is also threaded. Both threaded ends 140a, 140b of connection rod 140 threadably carry lock nuts 142.

Each of the crank arms 60, 62, 64, 66, 68 and 70 have fixedly mounted thereto intermediate of their ends, a radially projecting tang or connecting rod mounting plate 146 to the side facing the rocker arms via bolts 144. The tangs 146 each include a hole 148 passing therethrough. Hole 148 receives a bolt 150, which bolt 150 passes through a transverse hole 152 within a further rod end bearing 154. Each rod end bearing 154 carries a DELRIN sleeve through which the bolt 150 passes and further includes a radial arm 154a having a tapped axial hole 156 within the end thereof facing away from the crank arm to which it is mounted via tang 146. The threaded end 140b of the connecting rod threadably engages tapped hole 156 of rod end bearing 154, with the opposite end 140a thereof threaded into tapped hole 138 of rod end bearing 126. The connecting rod 140 is normally of predefined length but could be rotated so as to shorten or elongate the distance between rod end bearings 126 and 154. Once the connecting rods are threaded to the rod end bearings 126, 154, lock nuts 142 are tightened down against the ends of the radial arms of the rod end bearings 126, 154, provided with the tapped holes 138, 156, respectively. This arrangement permits the coupling of respective pairs of crank arms such as at 60, 62, for instance, on opposite side of a riser 24 supported by respective wheels 28, 30 to its common rocker arm 100 for controlled, equal but opposite oscillation of the crank arms 60, 62, during stepping of the machine across the turf T. The same arrangement is repeated for other pairs of crank arms of machine 10, as shown.

It should be appreciated that each bolt 150 functions as a pivot axis to permit a rod end bearing 154 to oscillate on a DELRIN sleeve 155 about a horizontal axis defined by hole 148 within tang 146 as defined by double headed arrow 160, FIG. 1, along with DELRIN sleeve 155.

Figure 2:
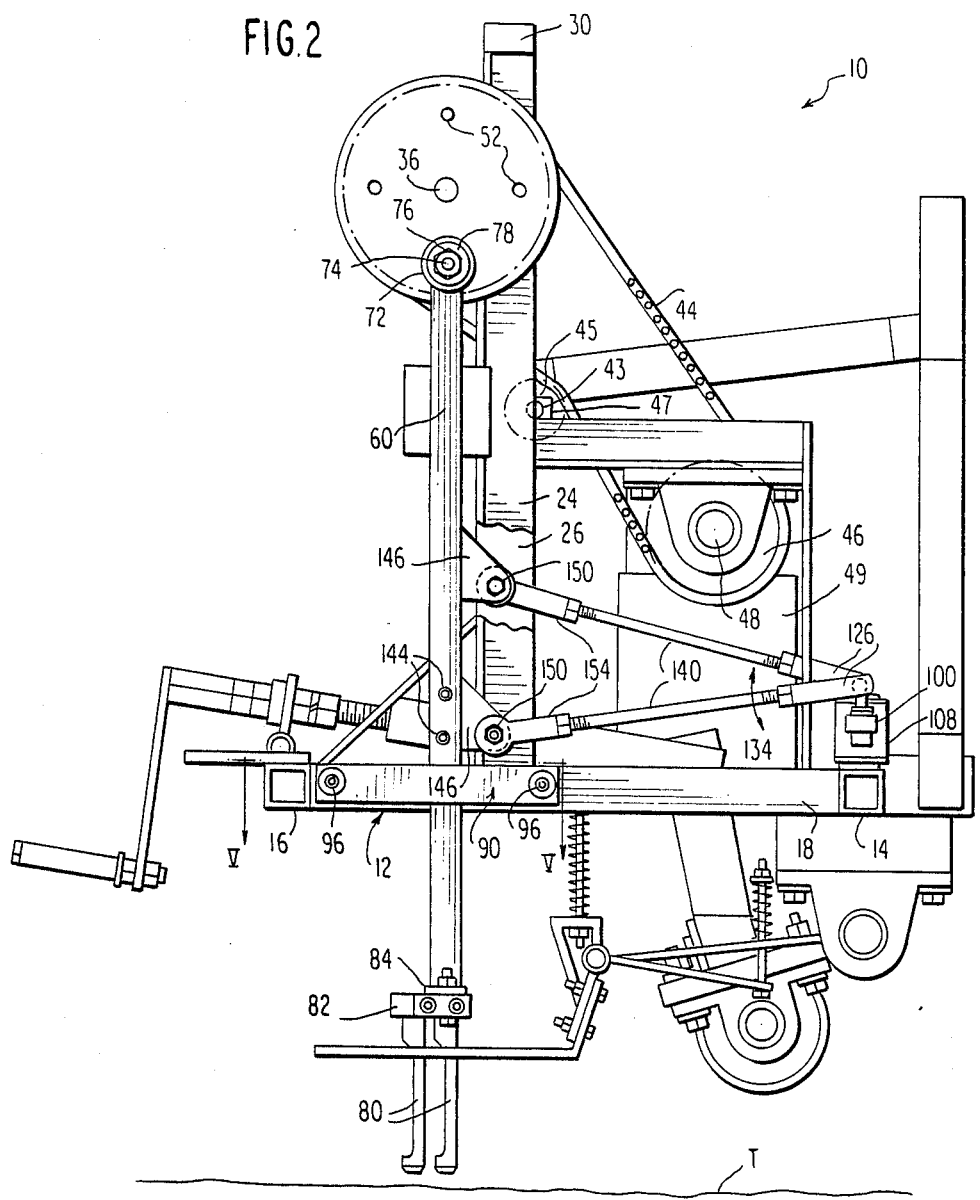
FIG. 2 is a side elevational view of the portion of the machine of FIG. 1, illustrating the rocker arm assembly for synchronized control of a pair of side by side tine arms moving fore and aft within paired slots through which the arms project.

In contrast, a ball and socket coupling is required to effect orthogonal movement of the end 140a of each connecting rod 140 to rocker arms 100, 102, etc. during oscillation of the rocker arms about the vertical axis of their mounting bolts 110 as indicated by double headed arrow 162, FIG. 1, via a ball and socket connection created by rod end bearings 126 as per arrows 123, 134, FIG. 2, during rise and fall of the crank arms 60-70, etc. as a result of cyclic rotation of the various pairs of wheels 28, 30.

The determination of the extent of travel of the machine 10, is effected by the power source such as a tractor (not shown) pulling the machine across the turf T. The oscillating of the crank arms fore and aft is preferably set at the factory for all crank arms. The oscillation of the two crank arms for each rocker arm is 180° out of phase to insure for wheels 28, 30 to opposite sides of a given riser, such as 24, the penetration of one set of the tines 80 into turf T of one of the crank arms such as 60, while the tines 80 of the adjacent crank arm 62 are being retracted therefrom. In all other respects, the machine of the present invention operates similar to that of applicant's prior U.S. Pat. Nos. 4,606,412 and 4,662,456. The timing of the various chain connections to the common drive shaft 48 and to requisite sprocket wheels 40 for each of the risers and the short length crank shaft sections 36 of the mechanism, via chains 44, is required, since the connection points for the upper ends of the crank arms to the wheels of the machine are purposely circumferentially offset 90° to space the tine penetration and retraction points for the tines 80 laterally across the machine during a full cycle of rotation of all of the wheels 38, 40 of the machine.

While the invention has been particularly shown and described with reference to a preferred embodiment thereof, it will be understood by those skilled in the art that the foregoing and other changes in form of details may be made therein, without departing from the spirit and scope of the invention.

What is claimed is:

1. In an aerating machine for turf comprising:
    a frame for traversing over said turf, a crankshaft, means for rotatably mounting said crankshaft on said frame transversely across said frame at right angles to the direction of travel of the frame;
    means forming a plurality of cranks along said shaft, a plurality of laterally spaced crank arms rotatably mounted, respectively at one end to said cranks for near vertical reciprocation by said crankshaft during rotation of the crankshaft, at least one tine rigidly fixed to another end of the crank arm, remote from said cranks;
    means for rotating said crankshaft;
    guide means fixed to said frame and defining a plurality of slots extending in the direction of movement of said frame and receiving the lower ends of respective crank tine arms for vertical reciprocation therein and for horizontal oscillation longitudinally thereof in the direction of said slots, whereby upon forward motion of the machine, the tines upon projection into the turf remain momentarily horizontally stationary during aerating machine movement forwardly, the improvement comprising:
    at least one rocker arm, means for mounting said at least one rocker arm at its center to said frame, rearwardly of a slot for pivoting about a vertical axis generally parallel to the direction of reciprocation of said crank arms and a pair of connecting rods pivotably mounted at one end to said rocker arm, respectively to opposite sides of the pivot axis of said rocker arm on said frame and having the other end pivotably coupled to laterally adjacent crank arms and being of equal length so as to cause said crank arms to oscillate 180° out of phase, within guide means slots and in opposition to each other during alternate projection of the tines of respective crank arms into the turf and retraction therefrom.

2. The aerating machine as claimed in claim 1, wherein said means for pivotably mounting said other end of each connecting rod to said crank arm comprises a plate projecting generally radially from an aligned crank arm with said plate extending parallel to the axis of the crank arm, a transverse hole within said plate, a bolt projecting transversely through said other end of said connecting rod and rotatably through said plate hole and a nut coupled to said bolt for locking said other end of said connecting rod to said plate but permitting oscillation of said connecting rod about the bolt axis.

3. The aerating machine as claimed in claim 2, wherein said one end of said each connecting rod has fixed thereto a first rod end bearing having a socket therein of spherical form having an axis at right angles to the axis of the hole through the other end of each said connecting rod receiving said bolt, and wherein said rocker arm includes rocker arm studs fixedly mounted thereto to opposite sides of the center thereof and projecting vertically therefrom with axes parallel to the axis of rotation of the rocker arm and each rocker arm stud including a spherical portion sized to and positioned within a respective rod end bearing socket at said one end of a corresponding connecting rod such that each said connecting arm at said one end rotates orthogonally relative to the rocker arm stud to facilitate fore and aft oscillation of the other end of said connecting rod during near vertical reciprocation of the crank arms coupled thereto.

4. The aerating machine as claimed in claim 3, wherein said rocker arm includes a cylindrical sleeve fixedly mounted thereto at the center thereof, a rocker arm mounting bolt is fixed to said frame and projects vertically upwardly therefrom, and a hollow roller cylindrical bearing is concentrically positioned about said rocker arm mounting bolt and has an outer diameter on the order of the inner diameter of said rocker arm sleeve and is coaxially mounted within said sleeve, such that said sleeve rotates about the periphery of the cylindrical bearing, and wherein the material of said roller bearing has a low coefficient of friction to facilitate oscillation of the rocker arm about the axis thereof.

5. The aerating machine as claimed in claim 1, wherein each said connecting rod is threaded at opposite ends, said first rod end bearing having a socket includes a radially projecting arm having a tapped axial bore within a free end thereof at right angles to the spherical socket and being sized to and threadably receiving one end of said connecting rod, and wherein a second rod end bearing couples said other end of said connecting rod to said plate and includes a radially projecting arm with a tapped axial bore within a free end thereof threadably receiving said other end of said connecting rod, and wherein the each threaded end of said connecting rod carries lock nuts loosely threaded thereon, whereby the connecting rod, by rotation, is threaded into the tapped axial bores of both said rod end bearings and said lock nuts are threaded into contact with the tapped ends of said rod end bearings to lock the connecting rod thereto.

6. The aerating machine as claimed in claim 1, wherein said frame includes a plurality of transversely spaced, longitudinally extending metal bars, and wherein said slots are formed by two longitudinally extending guide side bars fixedly mounted to said longitudinal frame bar to opposite sides thereof, and wherein a pair of rollers are rotatably mounted for rotation about horizontal axes and interposed between the guide side bars and of a length slightly in excess of the width of said crank arms, and wherein the distance between said pair of rollers is on the order of the length of the maximum permitted oscillation of the crank arm portion projecting through the slot such that the rollers act as positive stops for fore and aft oscillation of the crank arm.

7. The aerating machine as claimed in claim 6, wherein said guide side bars are formed of a low coefficient of friction molded plastic.

* * * * *